(12) United States Patent
Viancino

(10) Patent No.: US 8,466,580 B2
(45) Date of Patent: Jun. 18, 2013

(54) ELECTRICAL SYSTEM OF A VEHICLE WITH ELECTRICAL TRACTION

(75) Inventor: Riccardo Viancino, Turin (IT)

(73) Assignee: Magneti Marelli S.p.A. (IT)

( * ) Notice: Subject to any disclaimer, the term of this patent is extended or adjusted under 35 U.S.C. 154(b) by 77 days.

(21) Appl. No.: 13/229,074

(22) Filed: Sep. 9, 2011

(65) Prior Publication Data

US 2012/0112529 A1    May 10, 2012

(30) Foreign Application Priority Data

Sep. 10, 2010   (JE) .............................. BO2010A0552

(51) Int. Cl.
*B60L 1/00*     (2006.01)
(52) U.S. Cl.
USPC .......................................................... 307/9.1
(58) Field of Classification Search
USPC ....................................... 307/9.1, 89–91, 333
See application file for complete search history.

(56) References Cited

U.S. PATENT DOCUMENTS

| | | | |
|---|---|---|---|
| 5,796,175 A * | 8/1998 | Itoh et al. ...................... | 307/10.1 |
| 7,952,223 B2 * | 5/2011 | Masson et al. ................. | 307/9.1 |
| 2005/0162015 A1 | 7/2005 | Yamaguchi et al. | |
| 2010/0079105 A1 | 4/2010 | Iwanaga et al. | |
| 2011/0025127 A1 * | 2/2011 | Choi et al. .................... | 307/10.1 |
| 2011/0108340 A1 * | 5/2011 | Cherouvrier ............. | 180/65.265 |
| 2012/0025601 A1 * | 2/2012 | Nefcy et al. .................... | 307/9.1 |
| 2012/0200152 A1 * | 8/2012 | Schneider et al. ............. | 307/9.1 |

FOREIGN PATENT DOCUMENTS

DE         102008034663 A1    2/2009

OTHER PUBLICATIONS

Jun. 14, 2011 Search Report for Italian Patent App. No. B02010A 000552.

* cited by examiner

*Primary Examiner* — Jared Fureman
*Assistant Examiner* — Duc M Pham
(74) *Attorney, Agent, or Firm* — Bliss McGlynn, P.C.

(57) ABSTRACT

A vehicle includes an electrical traction and a reversible electric machine (8) that can be mechanically connected to drive wheels (3). An electrical system (11) of the vehicle includes a low-voltage storage system (14). An electronic power converter (15) has a positive pole (21) and a negative pole or an electrical ground (23) that are connected to the storage system (14) through a first electrical cable (18) defining a large section. An electronic control unit (17) controls the electronic power converter (15) and has a positive pole (24) and a negative pole or an electrical ground (25) that are connected to the storage system (14) through a second electrical cable (19) defining a small section. The electrical ground (23) of the electronic power converter (15) is connected to the electrical ground (25) of the electronic control unit (17) through an impedance having a value not lesser than substantially 100 ohms.

9 Claims, 2 Drawing Sheets

ELECTRICAL SYSTEM OF A VEHICLE WITH ELECTRICAL TRACTION

BACKGROUND OF INVENTION

1. Field of Invention

Figure 1:
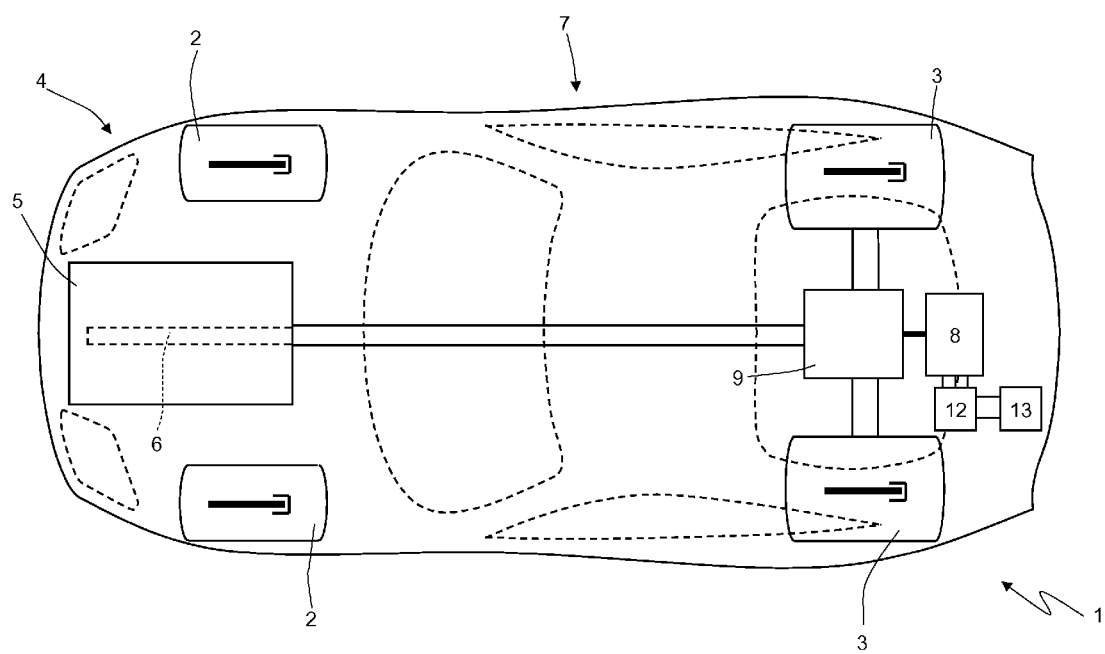

The invention relates, generally, to an electrical system of a vehicle and, more particularly, to such a system of a hybrid electrical and thermal vehicle that includes electrical traction.

2. Description of Related Art

The electrical system of a vehicle with hybrid electrical traction typically includes at least one electric machine (often, a synchronous alternating-current machine) that is reversible (i.e., that can work both as an electric motor by absorbing electricity and generating a mechanical motive torque and as an electrical generator by absorbing mechanical energy and generating electricity). The electric machine is also mechanically connectable to the drive wheels and controlled by a bi-directional "DC/AC" electronic-power converter (i.e., an inverter/rectifier). Furthermore, the electrical system of a hybrid-traction vehicle includes a high-voltage (and, thus, high-energy) storage system. The storage system includes a series of chemical-lithium batteries and, possibly, super-capacitors and is connected to the "DC/AC" electronic-power converter to exchange electricity with the "DC/AC" electronic-power converter itself (i.e., to supply electricity when the electric machine works as an electric motor and receive electricity when the machine works as an electric generator). Finally, the electrical system of a vehicle with hybrid traction normally includes a low-voltage [and, thus, low-energy (generally operating at 12 volts nominal)] storage system. The system includes a single chemical-lead battery supplying all auxiliary services of the vehicle that require an electrical supply and is connected to the high-voltage storage system by a mono- or bi-directional electronic "DC/DC" power converter (which adapts the voltage from the high voltage of the high-voltage storage system to the low voltage of the low-voltage storage system and replaces the traditional alternator of "thermal only" propulsion vehicles). In operation, the electronic "DC/DC" power converter transfers electricity from the high-voltage storage system to the low-voltage storage system (or, more rarely, vice versa) to supply the auxiliary services and/or recharge the low-voltage storage system.

Normally, the electronic "DC/AC" power converter that connects the high-voltage storage system to the electric machine and the electronic "DC/DC" power converter that connects the high-voltage storage system to the low-voltage storage system are housed in a same container and share the same electrical ground. Furthermore, the electronic microprocessor-control units of both converters are supplied by the low-voltage storage system because obtaining the 5 volts nominal needed for the electrical supply of the electronic microprocessor-control units is easy (i.e., cost-effective) starting from the 12 volts nominal of the low-voltage storage system while it is complex (i.e., costly) starting from the 400-600 volts nominal of the high-voltage storage system. Consequently, the container that houses the two converters is connected to the low-voltage storage system by two different electrical cables. The first two-pole electrical cable defining a large section intended to withstand the high currents (in the order of 200-300 amps) needed to supply electricity to the low-voltage storage system and/or auxiliary systems. The second two-pole electrical cable defines a small section intended to withstand the low currents (in the order of a few amps) necessary to supply electricity to all the electronic microprocessor-control units.

However, it has been observed that, in hybrid-traction vehicles having an electrical system of the type described above, electrical faults may occur that cause the melting of the electrical cable defining a small section that connects the low-voltage storage system to the electronic microprocessor units to supply electricity to the electronic microprocessor-control units themselves. Consequently, both electronic microprocessor-control units that control the converters stop working due to lack of electricity.

Thus, there is a need in the related art for an electrical system of a vehicle with electrical traction that is free from the drawbacks illustrated above. In particular, there is a need in the related art for such a system that is easy and cost-effective to implement. There is a need in the related art for such a system that is also very robust.

SUMMARY OF INVENTION

The invention overcomes the disadvantages in the related art in an electrical system of a vehicle including an electrical traction and a reversible electric machine that can be mechanically connected to drive wheels. The electrical system includes a low-voltage storage system. A first electronic power converter has a positive pole and a negative pole or an electrical ground that are connected to the low-voltage storage system through a first electrical cable defining a large section. A first electronic control unit controls the first electronic power converter and has a positive pole and a negative pole or an electrical ground that are connected to the low-voltage storage system through a second electrical cable defining a small section. The electrical ground of the first electronic power converter is connected to the electrical ground of the first electronic control unit through an impedance having a value not lesser than substantially 100 ohms.

One advantage of the electrical system of a vehicle of the invention is that it is easy and cost-effective to implement.

Another advantage of the electrical system of a vehicle of the invention is that it is very robust.

Another advantage of the electrical system of a vehicle of the invention is that it allows preservation of functionality of electronic microprocessor-control units and, thus, at least of a "DC/AC" power converter in case of undesired interruption of a connection between a negative pole of a low-voltage storage system and electrical ground of a "DC/DC" power converter.

Another advantage of the electrical system of a vehicle of the invention is that it allows robustness of the "DC/DC" power converter (in particular, the integrity of the system with different installation on the vehicle and wiring connection) by limiting a maximum current that may circulate through an electrical cable defining a small section in case of problems in an electrical cable defining a large section.

Another advantage of the electrical system of a vehicle of the invention is that, in the electrical system, electronic microprocessor-control units are immune from electromagnetic interferences present on the vehicle that may generate currents induced in two electrical grounds and damage a printed circuit of the electronic microprocessor-control units.

Another advantage of the electrical system of a vehicle of the invention is that it may be used either in a hybrid electrical and thermal vehicle or purely electrical traction vehicle.

Other objects, features, and advantages of the electrical system of a vehicle of the invention are readily appreciated as the system becomes more understood while the subsequent detailed description of at least one embodiment of the system is read taken in conjunction with the accompanying drawing thereof.

BRIEF DESCRIPTION OF EACH FIGURE OF DRAWING

Figure 2:
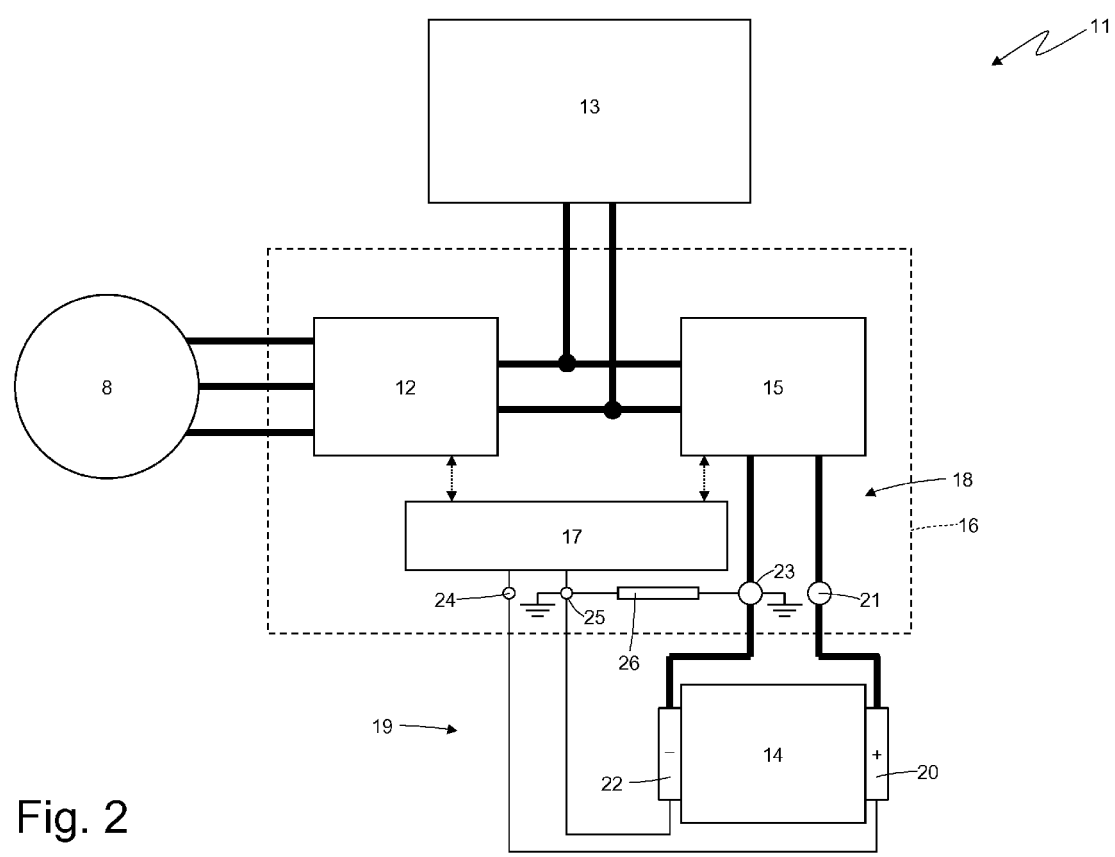

FIG. 1 is a diagrammatic view of a hybrid electrical and thermal traction vehicle; and FIG. 2 is a diagrammatic partial view of an electrical power system of the vehicle shown in FIG. 1 made in accordance with an embodiment of the invention.

DETAILED DESCRIPTION OF EMBODIMENT(S) OF INVENTION

In FIG. 1, a road vehicle with hybrid electrical and thermal traction provided with two front wheels 2 and two rear-drive wheels 3, which receive torque from a hybrid-propulsion system 4, is generally indicated at 1. The hybrid-propulsion system 4 includes an internal-combustion engine 5 (which is arranged in a frontal position and provided with a drive shaft 6), an automatic manual transmission 7 (commonly named "AMT" and which transmits the torque generated by the internal-combustion engine 5 to the rear-drive wheels 3), and a reversible electric machine 8 (i.e., an electric machine that can work both as an electric motor by absorbing electricity and generating mechanical torque and as an electric generator by absorbing mechanical energy and generating electricity). The reversible electric machine 8 is mechanically connected to the transmission 7 and, in particular, a gearbox 9 arranged in rear position to be connected to the rear-drive wheels 3. In an embodiment, the electric machine 8 is a synchronous machine working with alternating current.

As shown in FIG. 2, the vehicle 1 includes an electrical system 11 (only partially shown in FIG. 2) that includes an electronic "DC/AC" power converter (i.e., a "DC/AC" converter or inverter/rectifier), which controls the electric machine 8. Furthermore, the electrical system 11 includes a high-voltage (and, thus, high-energy) storage system 13 that has a series of chemical-lithium batteries and, possibly, supercapacitors and is connected to the electronic power converter 12 to exchange electricity with the electronic power converter 12 itself (i.e., providing electricity when the electric machine 8 works as an electric motor and receiving electricity when the electric machine 8 works as an electric generator).

The electrical system 11 includes also a low-voltage [and, thus, low-energy (generally operating at 12 volts nominal)] storage system 14 that has a single chemical-lead battery supplying all auxiliary services of the vehicle 1 that require an electrical supply and is connected to the high-voltage storage system 13 by a mono- or bi-directional electronic "DC/DC" power converter 15 (which adapts the voltage from the high voltage of the high-voltage storage system 13 to the low voltage of the low-voltage storage system 14). The electronic "DC/DC" power converter 15 replaces the traditional alternator of "thermal only" propulsion vehicles. In operation, the electronic "DC/DC" power converter 15 transfers electricity from the high-voltage storage system 13 to the low-voltage storage system 14 (or, more rarely, vice versa) to supply the auxiliary systems and/or recharge the low-voltage storage system 14.

The electronic "DC/AC" power converter 12 that connects the high-voltage storage system 13 to the electrical machine and the electronic "DC/DC" power converter 15 that connects the high-voltage storage system 13 to the low-voltage storage system 14 are housed in a same container 16. The common container 16 houses also the electronic microprocessor-control units 17 of both converters 12, 15. The electronic microprocessor-control units 17 are diagrammatically illustrated with a single block in FIG. 2 and, in fact, may be provided with a single piece of hardware that controls both the converters 12, 15 with two different independent software programs or two independent pieces of hardware having a common electrical supply.

The electronic microprocessor-control units 17 of both converters 12, 15 are supplied by the low-voltage storage system 14 because obtaining the 5 volts nominal needed for electrical supply of the electronic microprocessor-control units 17 is easy (i.e., cost-effective) starting from the 12 volts nominal of the low-voltage storage system 14 while it is complex (i.e., costly) starting from the 400-600 volts nominal of the high-voltage storage system 12. Consequently, the container 16 that accommodates the two converters 12, 15 is connected to the low-voltage storage system by two different two-pole electrical cables 18, 19. One two-pole electrical cable 18 defines a large section intended to withstand the high currents (in the order of 200-300 amps) needed to supply electricity to the low-voltage storage system 14 and/or auxiliary systems. Another two-pole electrical cable 19 defines a small section intended to withstand the low currents (in the order of a few amps) necessary to supply electricity to the electronic microprocessor-control units 17.

In particular, the two-pole cable 18 defining a large section connects a positive pole 20 of the low-voltage storage system 14 to a positive pole 12 of the electronic "DC/DC" power converter 15 and connects a negative pole 22 of the low-voltage storage system 14 to a negative pole or electrical ground 23 of the "DC/DC" converter 15. Furthermore, the two-pole cable 19 defining a small section connects a positive pole 20 of the low-voltage storage system 14 to a positive pole 12 of the electronic "DC/DC" power converter 17 and connects a negative pole 22 of the low-voltage storage system 14 to a negative pole or electrical ground 25 of the electronic microprocessor-control units 17.

According to an embodiment illustrated in FIG. 2, the electrical system 11 includes an interconnection resistor 26 that connects the electrical ground 23 of the electronic "DC/DC" power converter 15 to the electrical ground 25 of the electronic microprocessor-control unit 17. The interconnection resistor 26 has an impedance of no lesser than substantially 100 ohms and, in an embodiment, substantially equal to 100 kiloohms. The interconnection resistance 26 allows maintenance of an electrical connection between the two electrical grounds 23, 25 and, thus, simplifies and improves the communication of electrical signals (i.e., digital information) between the electronic microprocessor-control units 17 of the electronic "DC/DC" power-converter components 15.

According to another embodiment (not shown), the electrical ground 23 of the electronic "DC/DC" power converter 15 is substantially galvanically insulated from the electrical ground 25 of the electronic microprocessor-control units 17 (i.e., between the electrical grounds 23, 25, there is a theoretically infinite impedance and, in practice, a very high one (at least in the order to megaohms).

In operation, in case of undesired interruption of the connection between the negative pole 22 of the low-voltage storage system 14 and electrical ground 23 of the electronic "DC/DC" power converter 15 (e.g., following the partial disconnection or partial breakage of the electrical cable 18 defining a large section, the electrical current that circulates through the electrical cable 18 defining a large section is substantially interrupted and does not attempt to close again (if not in minimum part) through the electrical cable 19 defining a small section by effect of the high impedance existing between the electrical grounds 23, 25, in other words, by virtue of the high impedance existing between the electrical grounds 23, 25, in case of undesired interruption of the connection between the negative pole 22 of the low-voltage storage system 14 and electrical ground 23 of the electronic "DC/DC" power converter 15, the electricity that flows across the electrical cable defining a large section 18 is substantially interrupted and does not attempt to close (except in minimum part by effect of the limitation of the interconnection resistance 26) through the electrical cable 19 defining a small section.

In this manner, in case of undesired interruption of the connection between the negative pole 22 of the low-voltage storage system 14 and electrical ground 23 of the electronic "DC/DC" power converter 15, an additional electrical current strongly limited by the interconnection resistor 26 coming from the electronic "DC/DC" power converter 15 flows across the electrical cable defining a small section. Thus, the electrical cable 19 defining a small section is not concerned by additional electrical currents of high intensity and, thus, not interrupted in any manner (by melting of material or intervention of thermal or magnetic protections). Consequently, the functionality of the electronic microprocessor-control units 17 is preserved, and, thus, at least the "DC/AC" power converter 12 may continue to operate normally also in case of undesired interruption of the connection between the negative pole 22 of the low-voltage storage system 14 and electrical ground 23 of the "DC/DC" power converter 15. Furthermore, no type of damage occurs, but only a temporary interruption of the operation of the "DC/DC" power converter 15, which is fully restored simply by reconnecting the negative pole 22 of the low-voltage storage system 14 to the electrical ground 23 of the "DC/DC" power converter 15.

The electrical system 11 is simple and cost-effective to make because the electrical system 11 differs from an electrical system of the related art only for the partial electrical insulation (if the interconnection resistor 26 is used) or total electrical insulation (in case of galvanic insulation) between the electrical grounds 23, 25. Also, the electrical system 11 allows preservation of the functionality of the electronic microprocessor-control units 17 and, thus, at least of the "DC/AC" power converter 12 in case of undesired interruption of the connection between the negative pole 22 of the low-voltage storage system 14 and electrical ground 23 of the "DC/DC" power converter 15. Furthermore, the electrical system 11 allows the robustness of the "DC/DC" power converter 15 (in particular, the integrity of the system with different installation on the vehicle and wiring connection) by limiting the maximum current that may circulate through the electrical cable 19 defining a small section in case of problems in the electrical cable 18 defining a large section. In addition, in the electrical system 11, the electronic microprocessor-control units 17 are immune from the electromagnetic interferences present on the vehicle 1 that may generate currents induced in the two electrical grounds 23, 25 and damage the printed circuit 17 of the electronic microprocessor-control units 17. Moreover, the electrical system 11 may be used either in a hybrid electrical and thermal vehicle or purely electrical traction vehicle.

It should be appreciated by those having ordinary skill in the related art that the system 11 has been described above in an illustrative manner. It should be so appreciated also that the terminology that has been used above is intended to be in the nature of words of description rather than of limitation. It should be so appreciated also that many modifications and variations of the system 11 are possible in light of the above teachings. It should be so appreciated also that, within the scope of the appended claims, the system 11 may be practiced other than as specifically described above.

What is claimed is:

1. An electrical system (11) of a vehicle (1) including electrical traction and a reversible electric machine (8) that can be mechanically connected to drive wheels (3), said electrical system (11) comprising:
    a low-voltage storage system (14);
    a first electronic power converter (15) having a positive pole (21) and either of a negative pole and an electrical ground (23) that are connected to said low-voltage storage system (14) through a first electrical cable (18) defining a large section; and
    a first electronic control unit (17) that controls said first electronic power converter (15) and has a positive pole (24) and either of a negative pole and an electrical ground (25) that are connected to said low-voltage storage system (14) through a second electrical cable (19) defining a small section, wherein said electrical ground (23) of said first electronic power converter (15) is connected to said electrical ground (25) of said first electronic control unit (17) through an impedance having a value not lesser than substantially 100 ohms.

2. An electrical system (11) as set forth in claim 1, wherein said electrical ground (23) of said first electronic power converter (15) is connected to said electrical ground (25) of said first electronic control unit (17) through an impedance having a value of substantially 100 kiloohms.

3. An electrical system (11) as set forth in claim 1, wherein said electrical system (11) comprises further an interconnection resistance (26) that connects said electrical ground (23) of said first electronic power converter (15) to said electrical ground (25) of said first electronic control unit (17).

4. An electrical system (11) as set forth in claim 1, wherein said electrical ground (23) of said first electronic power converter (15) is substantially galvanically isolated from said electrical ground (25) of said first electronic control unit (17).

5. An electrical system (11) as set forth in claim 1, wherein said electrical system (11) comprises further a second electronic power converter (12) and common container (16) that houses said first and second electronic power converters (15, 12) with each other.

6. An electrical system (11) as set forth in claim 5, wherein said electrical system (11) comprises further a second electronic control unit (17) that controls said second electronic power converter (12) and shares with said first electronic control unit (17) said positive pole (24) and either of said negative pole and electrical ground (25) that are connected to said low-voltage storage system (14) through said second electrical cable (19).

7. An electrical system (11) as set forth in claim 5, wherein said electrical system (11) comprises further a high-voltage storage system (13).

8. An electrical system (11) as set forth in claim 7, wherein said first electronic power converter (15) is an electronic "DC/DC" power converter that connects said high-voltage storage system (13) to said low-voltage storage system (14).

9. An electrical system (11) as set forth in claim 7, wherein said second electronic power converter (12) is a bi-directional converter that connects said electric machine (8) to said high-voltage storage system (13).

* * * * *

UNITED STATES PATENT AND TRADEMARK OFFICE
CERTIFICATE OF CORRECTION

PATENT NO. : 8,466,580 B2  
APPLICATION NO. : 13/229074  
DATED : June 18, 2013  
INVENTOR(S) : Riccardo Viancino Page 1 of 1

It is certified that error appears in the above-identified patent and that said Letters Patent is hereby corrected as shown below:

On the title page, item 30, "Foreign Applications Priority Data" delete "(JE)" and insert therefor --(IT)--.

Signed and Sealed this
Eighteenth Day of February, 2014

Michelle K. Lee
*Deputy Director of the United States Patent and Trademark Office*